(12) United States Patent
Onishi et al.

(10) Patent No.: US 8,865,079 B2
(45) Date of Patent: Oct. 21, 2014

(54) HYDROCARBON SYNTHESIS REACTION APPARATUS, HYDROCARBON SYNTHESIS REACTION SYSTEM, AND HYDROCARBON SYNTHESIS REACTION METHOD

(75) Inventors: Yasuhiro Onishi, Tokyo (JP); Yuzuru Kato, Tokyo (JP); Eiichi Yamada, Tokyo (JP)

(73) Assignees: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP)

( * ) Notice: Subject to any disclaimer, the term of this patent is extended or adjusted under 35 U.S.C. 154(b) by 183 days.

(21) Appl. No.: 13/391,742

(22) PCT Filed: Aug. 12, 2010

(86) PCT No.: PCT/JP2010/063701
§ 371 (c)(1),
(2), (4) Date: Mar. 26, 2012

(87) PCT Pub. No.: WO2011/024652
PCT Pub. Date: Mar. 3, 2011

(65) Prior Publication Data
US 2012/0177539 A1 Jul. 12, 2012

(30) Foreign Application Priority Data
Aug. 31, 2009 (JP) .................................. 2009-200346

(51) Int. Cl.
*B01J 8/18* (2006.01)
*C10G 2/00* (2006.01)

(52) U.S. Cl.
CPC .............. *C10G 2/342* (2013.01); *B01J 8/1809* (2013.01); *B01J 8/1827* (2013.01)
USPC ........................... 422/105; 422/140; 422/146

(58) Field of Classification Search
CPC ....................................................... C10G 2/344
See application file for complete search history.

(56) References Cited

U.S. PATENT DOCUMENTS 2,584,391 A * 2/1952 Leffer ........................... 422/143
5,817,701 A 10/1998 Leviness et al.
(Continued)

FOREIGN PATENT DOCUMENTS

| JP | 2001-524155 | 11/2001 |
| JP | 2003-292972 | 10/2003 |
| JP | WO 2007/045495 | 4/2007 |

OTHER PUBLICATIONS

International Search Report dated Sep. 7, 2010 issued in corresponding PCT Application No. PCT/JP2010/063701.
Office Action dated Apr. 2, 2014 issued in corresponding Canadian Application No. 2,772,038.

(Continued)

*Primary Examiner* — Lessanework Seifu
(74) *Attorney, Agent, or Firm* — Kenyon & Kenyon LLP (57) ABSTRACT

A hydrocarbon synthesis reaction apparatus includes a reactor, and a synthesis gas supply line through which a synthesis gas is supplied to the reactor, and syntheses hydrocarbons by contacting the synthesis gas and the catalyst slurry in the reactor. The hydrocarbon synthesis reaction apparatus includes a spare supply line which is connected to the synthesis gas supply line, and supplies inert gas or hydrogen gas to the reactor through the synthesis gas supply line when supply of the synthesis gas to the synthesis gas supply line from the synthesis gas supply device is stopped, and a fluid heating device which heats at least one of a fluid which flows through a flowing line of the synthesis gas supply line located closer to the reactor than a portion connected with the spare supply line, and a fluid which flows through the spare supply line.

5 Claims, 1 Drawing Sheet

(56) References Cited

U.S. PATENT DOCUMENTS

| | | |
|---|---|---|
| 7,303,731 B2 | 12/2007 | Demirel et al. |
| 2003/0141221 A1 | 7/2003 | O'Rear et al. |
| 2007/0093560 A1 | 4/2007 | Althapp et al. |

OTHER PUBLICATIONS

Office Action dated Jan. 31, 2014 issued in corresponding Eurasian Application No. EA 201270303 [with English Translation].

\* cited by examiner

HYDROCARBON SYNTHESIS REACTION APPARATUS, HYDROCARBON SYNTHESIS REACTION SYSTEM, AND HYDROCARBON SYNTHESIS REACTION METHOD

TECHNICAL FIELD

The present invention relates to a hydrocarbon synthesis reaction apparatus, a hydrocarbon synthesis reaction system, and a hydrocarbon synthesis reaction method.

This application is a national stage application of International Application No. PCT/JP2010/063701, filed Aug. 12, 2010, which claims priority to Japanese Patent Application No. 2009-200346 filed on Aug. 31, 2009, the contents of which are incorporated herein by reference.

BACKGROUND ART

In recent years, as one of the methods for synthesizing liquid fuels from natural gas, the GTL (Gas To Liquids: liquid fuel synthesis) technique has been developed. In the GTL technique, natural gas is reformed to produce a synthesis gas containing hydrogen gas ($H_2$) and carbon monoxide gas (CO) as main components, hydrocarbons are synthesized by the Fischer-Tropsch synthesis reaction (hereinafter referred to as "FT synthesis reaction") with a catalyst using the synthesis gas as a source gas, and the hydrocarbons are hydrogenated and fractionated to prepare liquid fuel products, such as naphtha (crude gasoline), kerosene, gas oil, and wax.

Conventionally, as a hydrocarbon synthesis reaction apparatus which synthesizes hydrocarbons by the FT synthesis reaction, a configuration including a reactor which stores catalyst slurry having solid catalyst particles suspended in a liquid, and a synthesis gas supply line through which a synthesis gas supplied from a synthesis gas supply device which supplies the synthesis gas to the reactor is known. According to this hydrocarbon synthesis reaction apparatus, hydrocarbons can be synthesized by the FT synthesis reaction by contacting the synthesis gas and the catalyst slurry in the reactor.

In the above hydrocarbon synthesis reaction apparatus, the pressure in the reactor is higher compared to normal pressure, and the temperature of the reactor is higher compared to normal temperature in the FT synthesis reaction, so that the FT synthesis reaction is smoothly performed in the reactor.

In this type of hydrocarbon synthesis reaction apparatus, there is a possibility that supply of the synthesis gas to the synthesis gas supply line from the synthesis gas supply device may be stopped due to, for example, unexpected external factors (earthquake, power outage, or the like). In this case, the problems shown below may occur as the fluidization state of the catalyst slurry in the reactor is deteriorated.

First, as the FT synthesis reaction is continued with the synthesis gas remained in the reactor, the reaction heat released by the exothermic reaction is not efficiently removed because of the deterioration of the fluidization state of the catalyst slurry, a hot spot is temporarily formed in the catalyst slurry, and a part of the catalyst may possibly deteriorate by the excessive temperature rising. In this case, there is a problem in that the yield of the hydrocarbon synthesis by the FT synthesis reaction decreases after resumption of the operation at which the supply of the synthesis gas from the synthesis gas supply device has been resumed, compared to before stoppage of the operation at which supply of the synthesis gas has been stopped.

Moreover, the catalyst particles may be clogged in the synthesis gas supply line. In this case, there is a problem in that the synthesis gas from the synthesis gas supply device is not smoothly supplied to the reactor after operation is resumed, and in the worst case, the synthesis gas is not supplied at all.

Thus, for example, as shown in the following PTL 1, a method of supplying the other gas to the reactor, and securing the fluidization state of the catalyst slurry in the reactor when the supply of the synthesis gas to the reactor has been stopped is suggested.

CITATION LIST

Patent Literature

[PTL 1] Specification of US Patent Application Publication No. 2007-0093560

SUMMARY OF INVENTION

Technical Problem

However, a drop in the internal temperature of the reactor cannot be suppressed simply by supplying the gas to the reactor, and when the internal temperature of the reactor becomes lower than the freezing point of the medium liquid of the catalyst slurry, the medium liquid is solidified, and it is also difficult to secure the fluidization state of the catalyst slurry.

The invention was made in view of the aforementioned situation, and the object thereof is to provide a hydrocarbon synthesis reaction apparatus, a hydrocarbon synthesis reaction system, and a hydrocarbon synthesis reaction method, capable of suppressing a temperature drop in the reactor to secure the fluidization state of the catalyst slurry, and suppressing deterioration of the catalyst to improve the yield of the hydrocarbon synthesis after operation is resumed, when the supply of the synthesis gas to the reactor has been stopped.

Solution to Problem

In order to solve the above problems, the invention suggests the following means.

The hydrocarbon synthesis reaction apparatus according to the invention is provided with a reactor which stores a catalyst slurry having solid catalyst particles suspended in a liquid, and a synthesis gas supply line through which a synthesis gas, which is supplied from a synthesis gas supply device which supplies the synthesis gas containing a carbon monoxide gas and a hydrogen gas as main components, is supplied to the reactor, and synthesizes hydrocarbons by contacting the synthesis gas and the catalyst slurry in the reactor. The hydrocarbon synthesis reaction apparatus includes a spare supply line which is connected to the synthesis gas supply line, and supplies inert gas or hydrogen gas to the reactor through the synthesis gas supply line when supply of the synthesis gas to the synthesis gas supply line from the synthesis gas supply device is stopped, and a fluid heating device which heats at least one of a fluid which flows through a flowing line of the synthesis gas supply line located closer to the reactor than a portion connected with the spare supply line, and a fluid which flows through the spare supply line.

Additionally, the hydrocarbon synthesis reaction method according to the invention is a hydrocarbon synthesis reaction method of synthesizing hydrocarbons by contacting a synthesis gas and a catalyst slurry in a reactor, by using a hydrocarbon synthesis reaction apparatus including the reactor which stores a catalyst slurry having solid catalyst particles suspended in a liquid, and a synthesis gas supply line through which the synthesis gas, which is supplied from a synthesis gas supply device which supplies the synthesis gas including carbon monoxide gas and hydrogen gas as main components, is supplied to the reactor. The hydrocarbon synthesis reaction method includes heating inert gas or hydrogen gas, and supplying the heated inert gas or hydrogen gas to the reactor through the synthesis gas supply line when supply of the synthesis gas to the synthesis gas supply line from the synthesis gas supply device is stopped.

Here, in the invention, "inert gas" means a gas which does not participate in the reaction in the condition of the reactor which performs the FT synthesis reaction, does not chemically change, and does not affect the catalyst for the FT synthesis reaction.

According to the invention, since the fluid heating device is included, the inert gas or hydrogen gas supplied to the reactor from the spare supply line when the supply of the synthesis gas to the synthesis gas supply line from the synthesis gas supply device has been stopped can be heated before being supplied to the reactor, and the heated inert gas or hydrogen gas can be supplied to the reactor. Accordingly, it is possible to keep the internal temperature of the reactor from dropping, and to secure the fluidization state of the catalyst slurry, and deterioration of the catalyst can be suppressed.

Additionally, since the drop of the internal temperature of the reactor is suppressed, even if the synthesis gas remains in the reactor, metal carbonyl compounds which deteriorate the catalyst can be kept from generating. That is, when the internal temperature of the reactor drops to a temperature lower than the decomposition temperature of the metal carbonyl compounds, there is a possibility that the metal carbonyl compounds may generate as the synthesis gas which remains in the reactor comes into contact with the iron, nickel, or the like composing the steel which forms the reactor.

Moreover, since the inert gas, or the hydrogen gas as a component of the synthesis gas is supplied to the reactor when the supply of the synthesis gas has been stopped, the catalyst can be kept from deteriorating due to a fluid supplied to the reactor.

As described above, when the supply of the synthesis gas to the reactor has been stopped, it is possible to reliably suppress deterioration of the catalyst, and the yield of the hydrocarbon synthesis after operation is resumed can be improved.

Additionally, in the hydrocarbon synthesis reaction apparatus according to the invention, the inert gas may be a gas consisting of any one of nitrogen gas, carbon dioxide gas, rare gas, methane gas, and ethane gas, or a mixed gas in which a plurality of these gases are mixed.

In this case, since the inert gas is a gas consisting of any one of nitrogen gas, carbon dioxide gas, rare gas, methane gas, and ethane gas, or a mixed gas in which a plurality of these gases are mixed, it is possible to reliably keep the catalyst from deteriorating due to contacting the inert gas and the catalyst particles, and the yield of the hydrocarbon synthesis after operation is resumed can be further improved.

Additionally, in the hydrocarbon synthesis reaction apparatus according to the invention, the fluid heating device may be provided so as to heat the fluid which flows through the flowing line.

In this case, since the fluid heating device is provided so as to heat the fluid which flows through the flowing line, the synthesis gas supplied to the synthesis gas supply line from the synthesis gas supply device can also be heated before being supplied to the reactor while the normal operation. Thereby, even in a case where metal carbonyl compounds which have an effect on deterioration of the catalyst are contained in the synthesis gas, the synthesis gas can be heated by the fluid heating device up to a temperature higher than the decomposition temperature of the metal carbonyl compounds to decompose the metal carbonyl compounds and then supply the synthesis gas to the reactor. Accordingly, it is possible to keep the catalyst from deteriorating due to the metal carbonyl compounds contained in the synthesis gas, and the yield of the hydrocarbon synthesis can be further improved.

In addition, while the synthesis gas is supplied to the reactor from the synthesis gas supply device, the synthesis gas comes into contact with iron, nickel, or the like composing the steel which forms the hydrocarbon synthesis reaction apparatus. Thereby, the metal carbonyl compounds (for example, an iron-carbonyl compound or a nickel-carbonyl compound) which deteriorate the catalyst may generate in the synthesis gas.

Additionally, the hydrocarbon synthesis reaction apparatus according to the invention may further include a cooling device which cools the inside of the reactor. The cooling device may be configured so as to be switchable to a heating device which heats the inside of the reactor, when supply of the synthesis gas to the synthesis gas supply line from the synthesis gas supply device is stopped.

In this case, since the cooling device is included, even in a case where an exothermic reaction proceeds in the reactor, it is possible to keep the internal temperature of the reactor from excessively rising.

Additionally, the cooling device is configured so as to be switchable to a heating device which heats the inside of the reactor, when supply of the synthesis gas to the synthesis gas supply line from the synthesis gas supply device has been stopped. Thus, by heating the inside of the reactor by the heating device when the supply of the synthesis gas has been stopped, it is possible to reliably suppress a sudden drop in the internal temperature of the reactor and to reliably suppress the deterioration of the catalyst, and the yield of the hydrocarbon synthesis after the operation is resumed can be further improved.

Additionally, the hydrocarbon synthesis reaction apparatus according to the invention may further include a control device which detects the stoppage of the synthesis gas supply to supply the inert gas or hydrogen gas to the reactor through the spare supply line, when supply of the synthesis gas to the synthesis gas supply line from the synthesis gas supply device has been stopped.

In this case, since the control device is included, it is possible to reliably supply the inert gas or hydrogen gas to the reactor through the spare supply line when the supply of the synthesis gas to the synthesis gas supply line from the synthesis gas supply device has been stopped, and a sudden drop in the internal pressure and temperature of the reactor can be reliably suppressed. Accordingly, it is possible to reliably suppress deterioration of the catalyst, and the yield of the hydrocarbon synthesis after the operation is resumed can be further improved.

Additionally, the hydrocarbon synthesis reaction system according to the invention is a hydrocarbon synthesis reaction system which produces liquid fuel base stocks from hydrocarbon feedstocks. The system includes the hydrocarbon synthesis reaction apparatus according to the above invention, and an upgrading unit which refines the hydrocarbons to produce the liquid fuel base stocks. The synthesis gas supply device is a synthesis gas production unit which reforms the hydrocarbon feedstock to produce the synthesis gas, and supplies the synthesis gas to the synthesis gas supply line.

The hydrocarbon synthesis reaction system according to the invention includes the hydrocarbon synthesis reaction apparatus of the invention, in which the yield of the hydrocarbon synthesis is improved when operation is resumed after stoppage of the synthesis gas supply. Thus, the hydrocarbon synthesis reaction system can improve the yield of the liquid fuel base stock production from a hydrocarbon feedstock.

Advantageous Effects of Invention

According to the invention, when the supply of the synthesis gas to the reactor is stopped, a temperature drop in the reactor can be suppressed to secure the fluidization state of the catalyst slurry, and deterioration of the catalyst can be suppressed to improve the yield of the hydrocarbon synthesis after operation is resumed.

BEST MODE FOR CARRYING OUT THE INVENTION

Hereinafter, liquid fuel synthesizing system according to one embodiment of the invention will be described with reference to FIG. 1.

Figure 1:
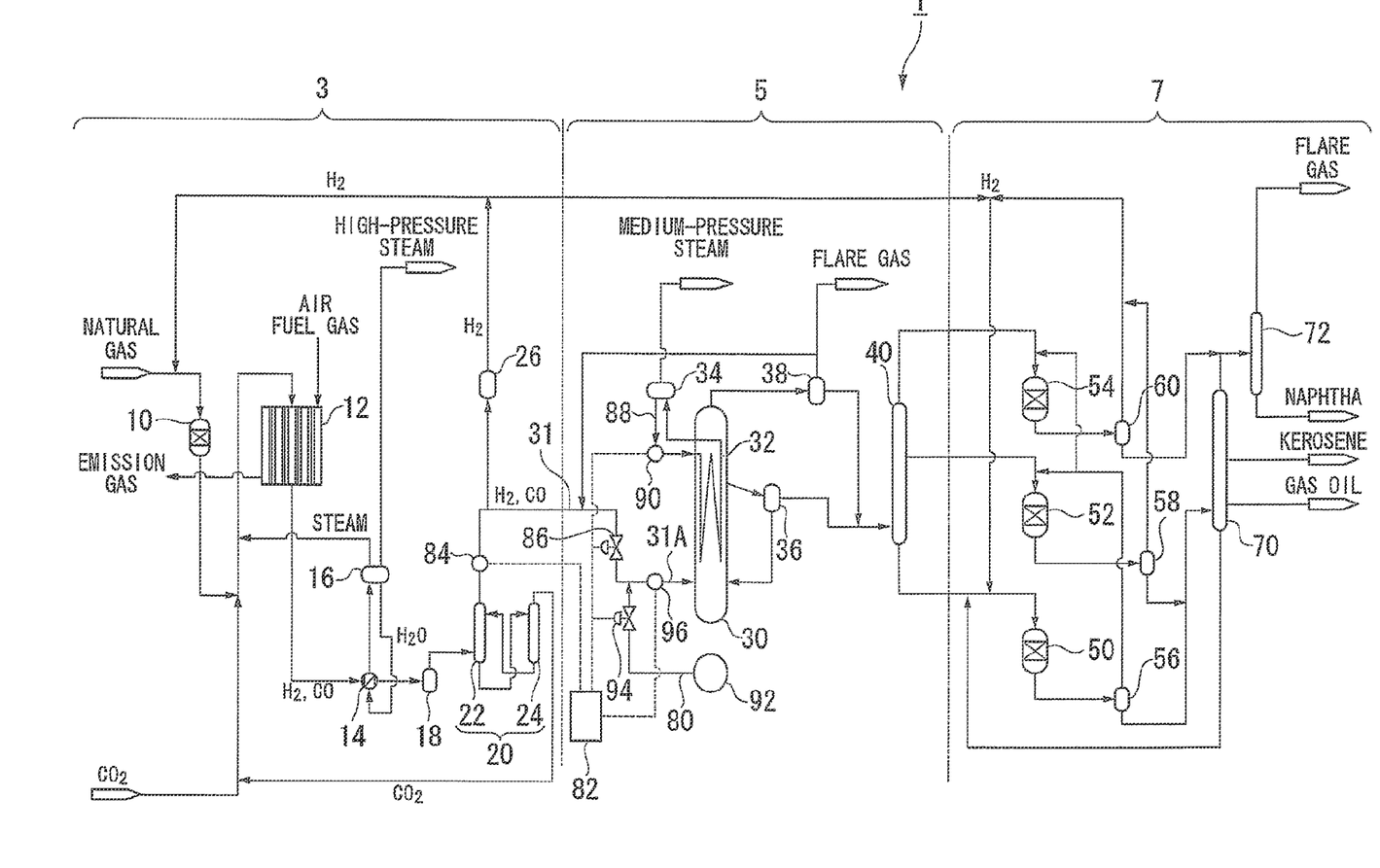
FIG. 1 is a schematic diagram showing the overall configuration of liquid fuel synthesizing system according to one embodiment of the invention.

As shown in FIG. 1, the liquid fuel synthesizing system (hydrocarbon synthesis reaction system) 1 is a plant facility which carries out the GTL process which converts a hydrocarbon feedstock, such as natural gas, into liquid fuels. The liquid fuel synthesizing system 1 includes a synthesis gas production unit 3, an FT synthesis unit (hydrocarbon synthesis reaction apparatus) 5, and an upgrading unit 7. The synthesis gas production unit 3 reforms natural gas, which is a hydrocarbon feedstock, to produce a synthesis gas including carbon monoxide gas and hydrogen gas. The FT synthesis unit 5 produces liquid hydrocarbons from the produced synthesis gas by the FT synthesis reaction.

The upgrading unit 7 hydrogenates and fractionally distills the liquid hydrocarbons produced by the FT synthesis reaction to produce base stocks of liquid fuel products (naphtha, kerosene, gas oil, wax, or the like) (liquid fuel base stocks). Hereinafter, components of these units will be described.

First, the synthesis gas production unit 3 will be described. The synthesis gas production unit 3 mainly includes, for example, a desulfurization reactor 10, a reformer 12, a waste heat boiler 14, gas-liquid separators 16 and 18, a $CO_2$ removal unit 20, and a hydrogen separator 26.

The desulfurization reactor 10 is composed of a hydrodesulfurizer, or the like, and removes sulfur components from natural gas which is a feedstock. The reformer 12 reforms the natural gas supplied from the desulfurization reactor 10, to produce synthesis gas including carbon monoxide gas (CO) and hydrogen gas ($H_2$) as main components. The waste heat boiler 14 recovers waste heat of the synthesis gas produced in the reformer 12 to generate high-pressure steam. The gas-liquid separator 16 separates the water heated by the heat exchange with the synthesis gas in the waste heat boiler 14 into gas (high-pressure steam) and liquid. The gas-liquid separator 18 removes condensed fractions from the synthesis gas cooled in the waste heat boiler 14, and supplies a gas component to the $CO_2$ removal unit 20. The $CO_2$ removal unit 20 has an absorption tower 22 which removes carbon dioxide gas by using an absorbent from the synthesis gas supplied from the gas-liquid separator 18, and a regeneration tower 24 which diffuses the carbon dioxide gas from the absorbent containing the carbon dioxide gas to regenerate the absorbent.

The hydrogen separator 26 separates a portion of the hydrogen gas contained in the synthesis gas, the carbon dioxide gas of which has been separated by the $CO_2$ removal unit 20. It is to be noted herein that the above $CO_2$ removal unit 20 may not be provided depending on circumstances.

Among these, the reformer 12 reforms natural gas by using carbon dioxide and steam to produce high-temperature synthesis gas containing carbon monoxide gas and hydrogen gas as main components, by a steam and carbon-dioxide-gas reforming method expressed by the following chemical reaction formulas (1) and (2). In addition, the reforming method in the reformer 12 is not limited to the example of the above steam and carbon-dioxide-gas reforming method. For example, a steam reforming method, a partial oxidation reforming method (POX) using oxygen, an autothermal reforming method (ATR) which is a combination of the partial oxidation method and the steam reforming method, a carbon-dioxide-gas reforming method, and the like can also be utilized.

$$CH_4 + H_2O \rightarrow CO + 3H_2 \tag{1}$$

$$CH_4 + CO_2 \rightarrow 2CO + 2H_2 \tag{2}$$

Additionally, the hydrogen separator 26 is provided on a line branching from a synthesis gas supply line 31 which connects the $CO_2$ removal unit 20 or gas-liquid separator 18 with the bubble column reactor 30. The hydrogen separator 26 can be composed of, for example, a hydrogen PSA (Pressure Swing Adsorption) device which performs adsorption and desorption of impurity gasses included in hydrogen gas by using a pressure difference. The hydrogen PSA device has adsorbents (zeolitic adsorbent, activated carbon, alumina, silica gel, or the like) within a plurality of adsorption towers (not shown) which are arranged in parallel. By sequentially repeating process including pressurizing, adsorption, desorption (depressurization), and purging of hydrogen gas which includes impurity gases in each of the adsorption towers, high-purity (for example, about 99.999%) hydrogen gas separated from the synthesis gas can be continuously supplied to a reactor.

In addition, the hydrogen gas separating method in the hydrogen separator 26 is not limited to the example of the pressure swing adsorption method as in the above hydrogen PSA device. For example, there may be a hydrogen storing alloy adsorption method, a membrane separation method, or a combination thereof.

The hydrogen storing alloy method is, for example, a technique of separating hydrogen gas using a hydrogen storing alloy (TiFe, LaNi$_5$, TiFe$_{0.7\ to\ 0.9}$, Mn$_{0.3\ to\ 0.1}$, TiMn$_{1.5}$, or the like) having a property which adsorbs or emits hydrogen gas by being cooled or heated. By providing a plurality of adsorption towers in which a hydrogen storing alloy is stored, and alternately repeating, in each of the adsorption towers, adsorption of hydrogen gas by cooling of the hydrogen storing alloy and emission of hydrogen gas by heating of the hydrogen storing alloy, hydrogen gas in synthesis gas can be separated and recovered.

Additionally, the membrane separation method is a technique of separating hydrogen gas having excellent membrane permeability out of a mixed gas, using a membrane made of a polymeric material, such as aromatic polyimide. Since this membrane separation method is not accompanied with a phase change, less energy for operation is required, and its operating costs are low. Additionally, since the structure of a membrane separation device is simple and compact, low equipment costs are required and the required installation area is also lower. Additionally, since there is no driving device in a separation membrane, and the stable operating range is wide, there is an advantage that maintenance and management are easy.

The synthesis gas production unit 3 configured as described above functions as a synthesis gas supply device which supplies the synthesis gas to the synthesis gas supply line 31, and supplies the synthesis gas to the FT synthesis unit 5 through the synthesis gas supply line 31.

Next, the FT synthesis unit 5 will be described. The FT synthesis unit 5 mainly includes, for example, the bubble column reactor 30, the synthesis gas supply line 31, a heat transfer pipe 32, a gas-liquid separator 34, a separator 36, a gas-liquid separator 38, a first fractionator 40, a spare supply line 80, and a control device 82.

The bubble column reactor 30, which is an example of a reactor which converts the synthesis gas into liquid hydrocarbons (synthesizes liquid hydrocarbons from synthesis gas), functions as an FT synthesis reactor which synthesizes liquid hydrocarbons from the synthesis gas by the FT synthesis reaction. The bubble column reactor 30 is composed of, for example, a bubble column slurry bed type reactor in which catalyst slurry consisting mainly of catalyst particles and medium oil is stored in a tower vessel. The bubble column reactor 30 produces gaseous or liquid hydrocarbons from the synthesis gas by the FT synthesis reaction. In detail, the synthesis gas which is a source gas supplied from the synthesis gas production unit 3 (the $CO_2$ removal unit 20 or the gas-liquid separator 18) is supplied to the bubble column reactor 30 through the synthesis gas supply line 31. Here, in the present embodiment, the synthesis gas supply line 31 supplies the synthesis gas from the bottom of the bubble column reactor 30, and is formed so that the synthesis gas supplied to the bubble column reactor 30 through the synthesis gas supply line 31 passes through the catalyst slurry stored in the bubble column reactor 30 while flowing up in the slurry. In the bubble column reactor 30, the synthesis gas supplied from the synthesis gas production unit 3 is supplied as bubbles from a spager at the bottom of the bubble column reactor 30, and passes through the catalyst slurry, and in a suspended state, hydrogen gas and carbon monoxide gas react with each other, as shown in the following chemical reaction formula (3).

$$2nH_2 + nCO \rightarrow (-CH_2-)_n + nH_2O \tag{3}$$

The synthesis gas supply line 31 is provided with a detecting device 84 which detects the stoppage of supply of the synthesis gas from the synthesis gas production unit 3 to the synthesis gas supply line 31, and a first on-off valve 86 which is provided so as to be able to open and close the synthesis gas supply line 31, and which allows the synthesis gas production unit 3 (the $CO_2$ removal unit 20 or the gas-liquid separator 18) and the bubble column reactor 30 to communicate with each other or be shut off from each other.

The detecting device 84 includes a flow meter (not shown) which measures the flow rate of the synthesis gas which flows through the synthesis gas supply line 31, and is provided so as to detect that the supply of the synthesis gas from the synthesis gas production unit 3 to the synthesis gas supply line 31 is stopped, for example, in a case where the flow rate of the synthesis gas measured by the flow meter is falls below a preset lower limit. Additionally, the detecting device 84 is provided so as to supply a detection signal to the control device 82 when the aforementioned stoppage has been detected.

The first on-off valve 86 is provided in the portion of the synthesis gas supply line 31 which is located closer to the bubble column reactor 30 than any of a connected portion between the synthesis gas supply line 31 and the above branch line, and the detecting device 84. In addition, the opening and closing state of the first on-off valve 86 is controlled by the control device 82, and the first on-off valve 86 is brought into an opened state at a normal time when the synthesis gas is supplied to the synthesis gas supply line 31 from the synthesis gas production unit 3.

Since the FT synthesis reaction is an exothermic reaction, the bubble column reactor 30 is of a heat-exchanger type which has the heat transfer pipe 32 disposed therein. For example, water (BFW: Boiler Feed Water) is supplied to the heat transfer pipe 32 as a coolant so that the reaction heat of the above FT synthesis reaction can be recovered as medium-pressure steam by the heat exchange between the cattery slurry and water. That is, the heat transfer pipe 32 functions as a cooling device which cools the inside of the bubble column reactor 30. As the FT synthesis unit 5 includes the heat transfer pipe 32, the internal temperature of the bubble column reactor 30 during the FT synthesis reaction, i.e., the reaction temperature of the FT synthesis reaction, is maintained at an approximately constant temperature (for example, 230° C.).

The gas-liquid separator 34 separates the water flowed and heated through the heat transfer pipe 32 disposed within the bubble column reactor 30 into steam (medium-pressure steam) and liquid. Additionally, the gas-liquid separator 34 is provided with piping 88 through which the water separated as liquid is supplied to the heat transfer pipe 32, and the piping 88 is provided with a heater 90 which heats the water (liquid) which flows through the piping 88. As the heater 90, for example, a heat exchanger or the like can be adopted. Heating of the water which flows through the piping 88 by the heater 90 is controlled by the control device 82. Additionally, the heater 90 is provided with a dedicated driving source (not shown) independent from other components, and the heater 90 is provided so as to be able to operate (heat), even in a case where other components have stopped.

The heat transfer pipe 32 formed as described above is adapted so that switching can be made to a heating device which heats the inside of the bubble column reactor 30 from a cooling device which cools the inside of the bubble column reactor 30 by heating the water which flows through the piping 88 with the heater 90.

The separator 36, which is an example of a filtering device which separates the catalyst particles and the liquid hydrocarbons in the catalyst slurry, is arranged outside the bubble column reactor 30. The gas-liquid separator 38 is connected to the top of the bubble column reactor 30 to cool unreacted synthesis gas and gaseous hydrocarbon products. The first fractionator 40 fractionally distills the liquid hydrocarbons supplied via the separator 36 and the gas-liquid separator 38 into individual fractions according to boiling points. In addition, the separator 36 may be arranged within the bubble column reactor 30.

The spare supply line 80 is connected to the synthesis gas supply line 31, and supplies inert gas to the bubble column reactor 30 through the synthesis gas supply line 31 when the supply of the synthesis gas to the synthesis gas supply line 31 from the synthesis gas production unit 3 has been stopped. While the gas supplied when the supply of the synthesis gas has been stopped is inert gas or hydrogen gas, explanation below shows an example using the inert gas. Here, "inert gas" means a gas which does not participate in the reaction in the condition of the reactor which performs the FT synthesis reaction, does not chemically change, and does not affect the catalyst for the FT synthesis reaction. For example, a gas consisting of any one of nitrogen gas, carbon dioxide gas, rare gas, methane gas, and ethane gas, or a mixed gas in which a plurality of these gases are mixed can be appropriately adopted.

One end of the spare supply line 80 is connected to the portion of the synthesis gas supply line 31 which is located closer to the bubble column reactor 30 than the first on-off valve 86. Additionally, a spare gas tank 92 which has the inert gas stored therein is connected to the other end of the spare supply line 80. The synthesis gas supply line 31 and the spare gas tank 92 are allowed to communicate with each other by the spare supply line 80 formed in this way.

Additionally, the internal pressure of the spare gas tank 92 is higher than the highest internal pressure which is assumed in the bubble column reactor 30 when the synthesis gas is supplied to the synthesis gas supply line 31 from the synthesis gas production unit 3 and the FT synthesis reaction is performed. Moreover, the spare supply line 80 is provided with a second on-off valve 94 which is provided so as to be able to open and close the spare supply line 80, and allows the synthesis gas supply line 31 and the spare gas tank 92 to communicate with each other or be shut off from each other. In addition, the opening and closing state of the second on-off valve 94 is controlled by the control device 82, and the second on-off valve 94 is closed in the normal state.

According to the spare supply line 80, the spare gas tank 92, and the second on-off valve 94 which are formed as described above, inert gas is not supplied to the bubble column reactor 30 from the spare supply line 80 in the normal state since the second on-off valve 94 is in a closed state. Additionally, in a case where the second on-off valve 94 is in an opened state, the internal pressure of the spare gas tank 92 is higher than the highest internal pressure in the bubble column reactor 30 when the synthesis gas is supplied to the synthesis gas supply line 31 from the synthesis gas production unit 3 and the FT synthesis reaction is performed. Therefore, the inert gas within the spare gas tank 92 is supplied to the bubble column reactor 30 from the spare supply line 80.

In the present embodiment, the FT synthesis unit 5 is provided with a fluid heating device 96 which heat at least one of a fluid which flows through a flowing line 31A of the synthesis gas supply line 31 which is located closer to the bubble column reactor 30 than a portion connected with the spare supply line 80, and a fluid which flows through the spare supply line 80. In the illustrated example, the fluid heating device 96 is provided so as to heat the fluid which flows through the above flowing line 31A.

As the fluid heating device 96, for example, a heat exchanger or the like can be adopted. Heating of the fluid which flows through the above flowing line 31A by the fluid heating device 96 is controlled by the control device 82. Additionally, the fluid heating device 96 is provided with a dedicated driving source (not shown) independent from other components, and the fluid heating device 96 is provided so as to be able to operate (heat), even in a case where other components have stopped.

Additionally, the fluid heating device 96 is provided so as to be able to heat the synthesis gas which is supplied from the synthesis gas production unit 3 and flows through the synthesis gas supply line 31 to the decomposition temperature or higher of metal carbonyl compounds. In the present embodiment, the fluid heating device 96 is provided so as to be able to heat the synthesis gas to the decomposition temperature or higher of an iron-carbonyl compound or a nickel-carbonyl compound. Specifically, the fluid heating device 96 is provided so as to be able to heat the synthesis gas to 140° C. or higher, preferably 140° C. or higher and the reaction temperature of the FT synthesis reaction or lower, and more preferably 200° C. or higher and the reaction temperature of the FT synthesis reaction or lower.

When supply of the synthesis gas to the synthesis gas supply line 31 from the synthesis gas production unit 3 is stopped, the control device 82 detects the stoppage to make the inert gas supplied to the bubble column reactor 30 through the spare supply line 80. The operation of the control device 82 will be described in detail with the description of the operation of the FT synthesis unit 5 which will be described later.

Finally, the upgrading unit 7 will be described. The upgrading unit 7 includes, for example, a wax fraction hydrocracking reactor 50, a middle distillate hydrotreating reactor 52, a naphtha fraction hydrotreating reactor 54, gas-liquid separators 56, 58, and 60, a second fractionator 70, and a naphtha stabilizer 72. The wax fraction hydrocracking reactor 50 is connected to a bottom of the first fractionator 40. The middle distillate hydrotreating reactor 52 is connected to a middle part of the first fractionator 40. The naphtha fraction hydrotreating reactor 54 is connected to a top of the first fractionator 40. The gas-liquid separators 56, 58 and 60 are provided so as to correspond to the hydrogenation reactors 50, 52 and 54, respectively. The second fractionator 70 fractionally distills the liquid hydrocarbons supplied from the gas-liquid separators 56 and 58 depending on boiling points. The naphtha stabilizer 72 fractionates liquid hydrocarbons of a naphtha fraction supplied from the gas-liquid separator 60 and the second fractionator 70, to discharge butane and components lighter than butane as a flare gas, and to recover components having a carbon number of five or more as a naphtha product.

Next, a process (GTL process) of producing liquid fuel base stocks from natural gas by the liquid fuel synthesizing system 1 configured as above will be described.

Natural gas (the main component of which is $CH_4$) as a hydrocarbon feedstock is supplied to the liquid fuel synthesizing system 1 from an external natural gas supply source (not shown), such as a natural gas field or a natural gas plant. The above synthesis gas production unit 3 reforms the natural gas to produce the synthesis gas (mixed gas containing carbon monoxide gas and hydrogen gas as main components).

Specifically, first, the above natural gas is supplied to the desulfurization reactor 10 along with the hydrogen gas separated by the hydrogen separator 26. The desulfurization reactor 10 desulfurizes the natural gas by converting sulfur components contained in the natural gas to a hydrogen sulfide using the hydrogen gas with a known hydrodesulfurizaiton catalyst, and by absorbing the generated hydrogen sulfide with an absorber such as ZnO. By desulfurizing natural gas in advance in this way, the activity of catalysts used in the reformer 12, the bubble column reactor 30, or the like can be prevented from being reduced due to the sulfur components.

The natural gas (may also contain carbon dioxide) desulfurized in this way is supplied to the reformer 12 after the carbon dioxide ($CO_2$) gas supplied from a carbon-dioxide supply source (not shown) and the steam generated in the waste heat boiler 14 are mixed. The reformer 12 reforms natural gas using carbon dioxide and steam to produce high-temperature synthesis gas including carbon monoxide gas and hydrogen gas as main components, by the above steam and carbon-dioxide-gas reforming method. At this time, the reformer 12 is supplied with, for example, fuel gas for a burner provided in the reformer 12 and air, and reaction heat required for the above steam and carbon-dioxide-gas reforming reaction which is an endothermic reaction is provided by the heat of combustion of the fuel gas in the burner.

The high-temperature synthesis gas (for example, 900° C., 2.0 MPaG) produced in the reformer 12 in this way is supplied to the waste heat boiler 14, and is cooled by the heat exchange with the water which flows through the waste heat boiler 14 (for example, 400° C.), thereby recovering the waste heat. At this time, the water heated by the synthesis gas in the waste heat boiler 14 is supplied to the gas-liquid separator 16. From the gas-liquid separator 16, a gas component is supplied to the reformer 12 or other external devices as high-pressure steam (for example, 3.4 to 10.0 MPaG), and water as a liquid component is returned to the waste heat boiler 14.

Meanwhile, the synthesis gas cooled in the waste heat boiler 14 is supplied to the absorption tower 22 of the $CO_2$ removal unit 20, or the bubble column reactor 30, after condensed fractions are separated and removed in the gas-liquid separator 18. The absorption tower 22 removes the carbon dioxide gas from the synthesis gas by absorbing the carbon dioxide gas contained in the synthesis gas with an absorbent reserved therein. The absorbent including the carbon dioxide gas within the absorption tower 22 is brought to the regeneration tower 24, the absorbent including the carbon dioxide gas is heated and subjected to stripping treatment with, for example, steam, and the resulting diffused carbon dioxide gas is sent to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio suitable for the FT synthesis reaction (for example, $H_2$:CO=2:1 (molar ratio)). In addition, the pressure of the synthesis gas supplied to the bubble column reactor 30 is raised to a pressure suitable for the FT synthesis reaction (for example, about 3.6 MPaG) by a compressor (not shown) provided in the synthesis gas supply line 31.

Additionally, a portion of the synthesis gas, from which the carbon dioxide gas has been separated by the above $CO_2$ removal unit 20, is supplied also to the hydrogen separator 26. The hydrogen separator 26 separates the hydrogen gas contained in the synthesis gas by the adsorption and desorption (hydrogen PSA) utilizing a pressure difference as described above. The separated hydrogen gas is continuously supplied from a gas holder or the like (not shown) via a compressor (not shown) to various hydrogen-utilizing reaction devices in the liquid fuel synthesizing system 1 (for example, the desulfurization reactor 10, the wax fraction hydrocracking reactor 50, the middle distillate hydrotreating reactor 52, the naphtha fraction hydrotreating reactor 54, or the like) which perform predetermined reactions by utilizing hydrogen gas.

Next, the above FT synthesis unit 5 produces liquid hydrocarbons by the FT synthesis reaction from the synthesis gas produced in the above synthesis gas production unit 3.

Specifically, the synthesis gas from which the carbon dioxide gas has been separated in the above $CO_2$ removal unit 20 flows into the bubble column reactor 30 through the synthesis gas supply line 31. Here, the synthesis gas which flows through the synthesis gas supply line 31 is cooled to about 40° C. by a heat exchanger (not shown) before being supplied to the above $CO_2$ removal unit 20. Thus, in the present embodiment, the cooled synthesis gas is heated by a fluid heating device 96 so as to be, for example, about 200° C. when the synthesis gas is supplied to the bubble column reactor 30.

Thereafter, the heated synthesis gas flows in from the bottom of the bubble column reactor 30, and flows up in the catalyst slurry stored in the bubble column reactor 30. At this time, within the bubble column reactor 30, the carbon monoxide gas and hydrogen gas which are contained in the synthesis gas react with each other by the FT synthesis reaction as described above, thereby producing hydrocarbons. Additionally, by flowing water through the heat transfer pipe 32 in the bubble column reactor 30 during this synthesis reaction, the reaction heat of the FT synthesis reaction is removed, and a portion of the water heated by this heat exchange is vaporized into steam. Among the steam and water, the water separated in the gas-liquid separator 34 is returned to the heat transfer pipe 32, and a gas component is supplied to external devices as medium-pressure steam (for example, 1.0 to 2.5 MPaG).

The liquid hydrocarbons synthesized in the bubble column reactor 30 in this way are discharged as the catalyst slurry from the middle part of the bubble column reactor 30, and are brought to the separator 36. The separator 36 separates the discharged slurry into catalyst particles (a solid component) and a liquid component containing a liquid hydrocarbon product. Some of the separated catalyst particles are returned to the bubble column reactor 30, and the liquid component is supplied to the first fractionator 40. From the top of the bubble column reactor 30, an unreacted synthesis gas, and a gas component of the synthesized hydrocarbons are introduced into the gas-liquid separator 38. The gas-liquid separator 38 cools these gases to separate some condensed liquid hydrocarbons to introduce them into the first fractionator 40. Meanwhile, most of the gas component separated in the gas-liquid separator 38, being mainly composed of the unreacted synthesis gas and hydrocarbons of $C_4$ or lighter, is returned to the bottom of the bubble column reactor 30, and the unreacted synthesis gas therein is reused for the FT synthesis reaction. In addition, the remaining gas component may be used as fuel gas of the reformer 12, or may be introduced into an external combustion facility (not shown), to be combusted therein, and then to be emitted to the atmosphere.

Next, the first fractionator 40 fractionally distills the hydrocarbons (the carbon numbers of which are various) supplied via the separator 36 and the gas-liquid separator 38 from the bubble column reactor 30 as described above, into a naphtha fraction (the boiling point of which is lower than about 150° C.), a middle distillate equivalent to kerosene and gas oil fraction (the boiling point of which is about 150 to 360° C.), and a wax fraction (the boiling point of which exceeds about 360° C.). Liquid hydrocarbons of the wax fraction discharged from the bottom of the first fractionator 40 (mainly $C_{21}$ or more) are brought to the wax fraction hydrocracking reactor 50. Liquid hydrocarbons of the middle distillate equivalent to kerosene and gas oil fraction discharged from the middle part of the first fractionator 40 (mainly $C_{11}$ to $C_{20}$) are brought to the middle distillate hydrotreating reactor 52. Liquid hydrocarbons of the naphtha fraction discharged from the top of the first fractionator 40 (mainly $C_5$ to $C_{10}$) are brought to the naphtha fraction hydrotreating reactor 54.

The wax fraction hydrocracking reactor 50 hydrocracks the liquid hydrocarbons of the wax fraction with a large carbon number (approximately $C_{21}$ or more), which has been discharged from the bottom of the first fractionator 40, using the hydrogen gas supplied from the above hydrogen separator 26, to reduce the carbon number of the hydrocarbons to approximately 20 or less. In the hydrocracking reaction, hydrocarbons with a small carbon number (with low molecular weight) are produced by cleaving C—C bonds of the hydrocarbons with a large carbon number, using a catalyst and heat. A product containing the liquid hydrocarbons obtained by hydrocracking in the wax fraction hydrocracking reactor 50 is separated into gas and liquid in the gas-liquid separator 56, and the liquid hydrocarbons of which are brought to the second fractionator 70, and the gas component (containing hydrogen gas) of which is brought to the middle distillate hydrotreating reactor 52 and the naphtha fraction hydrotreating reactor 54.

The middle distillate hydrotreating reactor 52 hydrotreats the liquid hydrocarbons of the middle distillate equivalent to kerosene and gas oil fraction having a middle carbon number (approximately $C_{11}$ to $C_{20}$), which have been discharged from the middle part of the first fractionator 40, using the hydrogen gas supplied via the wax fraction hydrocracking reactor 50 from the hydrogen separator 26. In the hydrotreating reaction, mainly in order to obtain branched saturated hydrocarbons, the liquid hydrocarbons are isomerized, and hydrogen is added to unsaturated bonds of the above liquid hydrocarbons to saturate the liquid hydrocarbons. As a result, a product containing the hydrotreated liquid hydrocarbons is separated into gas and liquid in the gas-liquid separator 58, the liquid hydrocarbons of which are brought to the second fractionator 70, and the gas component (containing hydrogen gas) of which is reused for the above hydrogenation reactions.

The naphtha fraction hydrotreating reactor 54 hydrotreats liquid hydrocarbons of the naphtha fraction with a low carbon number (approximately $C_{10}$ or less), which have been from the top of the first fractionator 40, using the hydrogen gas supplied via the wax fraction hydrocracking reactor 50 from the hydrogen separator 26. As a result, a product containing the hydrotreated liquid hydrocarbons is separated into gas and liquid in the gas-liquid separator 60, the liquid hydrocarbons of which are brought to the naphtha stabilizer 72, and the gas component (containing hydrogen gas) of which is reused for the above hydrogenation reactions.

Next, the second fractionator 70 fractionally distills the liquid hydrocarbons supplied from the wax fraction hydrocracking reactor 50 and the middle distillate hydrotreating reactor 52 as described above, into naphtha fraction with which a carbon number is approximately 10 or less (the boiling point of which is lower than about 150° C.), kerosene fraction (the boiling point of which is about 150 to 250° C.), gas oil fraction (the boiling point of which is about 250 to 360° C.), and an uncracked wax fraction from the wax fraction hydrocracking reactor 50 (the boiling point of which is higher than about 360° C.). The uncracked wax fraction is obtained from the bottom of the second fractionator 70, and is recycled to the upstream of the wax fraction hydrocracking reactor 50. Kerosene fraction and gas oil fraction are discharged from the middle part of the second fractionator 70. Meanwhile, hydrocarbons with which a carbon number is approximately 10 or less are discharged from the top of the second fractionator 70, and are supplied to the naphtha stabilizer 72.

Moreover, the naphtha stabilizer 72 fractionally distills the hydrocarbons with which a carbon number is approximately 10 or less which have been supplied from the above naphtha fraction hydrotreating reactor 54 and second fractionator 70 to obtain naphtha ($C_5$ to $C_{10}$) as a product. Accordingly, high-purity naphtha is discharged from a bottom of the naphtha stabilizer 72. Meanwhile, the gas other than products (flare gas), which contains hydrocarbons with a carbon number equal to or less than a predetermined number (equal to or less than $C_4$) as a main component, is discharged from the top of the naphtha stabilizer 72. This gas may be used as the fuel gas of the reformer 12, may be recovered as LPG (not shown) and may be introduced into an external fuel facility (not shown) to be combusted therein and to be then emitted to the atmosphere.

Next, in the liquid fuel synthesizing system 1 configured as described above, the operation (the hydrocarbon synthesis reaction method) of the FT synthesis unit 5 when supply of the synthesis gas to the synthesis gas supply line 31 from the synthesis gas production unit 3 is stopped due to, for example, unexpected external factors (an earthquake, power outage, or the like) will be described.

First, a detecting step of detecting that supply of the synthesis gas to the synthesis gas supply line 31 from the synthesis gas production unit 3 is stopped is performed. In the present embodiment, the detecting device 84 detects the stoppage of the supply of the synthesis gas to the synthesis gas supply line 31 from the synthesis gas production unit 3, and supplies a detection signal to the control device 82.

Next, when the supply of the synthesis gas to the synthesis gas supply line 31 from the synthesis gas production unit 3 has been stopped, a spare supply step of supplying the inert gas to the bubble column reactor 30 through the synthesis gas supply line 31 is performed. In the present embodiment, the control device 82 detects the stoppage of the supply of the synthesis gas from the synthesis gas production unit 3 based on the above detection signal, and makes the inert gas supplied to the bubble column reactor 30 through the spare supply line 80. In this case, the control device 82 brings the second on-off valve 94 into an opened state after bringing the first on-off valve 86 into a closed state, whereby the inert gas within the spare gas tank 92 is supplied to the bubble column reactor 30 through the spare supply line 80 and the above flowing line 31A of the synthesis gas supply line 31. Here, in the present embodiment, the first on-off valve 86 is brought into a closed state. Thus, the inert gas does not flow toward the synthesis gas production unit 3 through the synthesis gas supply line 31, and the inert gas can be reliably supplied to the bubble column reactor 30.

Then, in the present embodiment, in the spare supply step, the inert gas is heated, and is then supplied to the bubble column reactor 30. That is, the inert gas which passes through the above flowing line 31A is heated by the fluid heating device 96, and is then supplied to the bubble column reactor 30.

Additionally, in the present embodiment, the control device 82 controls the heater 90 provided the piping 88, thereby switching the heat transfer pipe 32 to the heating device which heats the inside of the bubble column reactor 30 and heating the inside of the bubble column reactor 30. That is, the heat transfer pipe 32 is configured so as to be switchable to the heating device which heats the inside of the bubble column reactor 30 when the supply of the synthesis gas to the synthesis gas supply line 31 from the synthesis gas production unit 3 has been stopped.

As shown above, according to the FT synthesis unit 5 related to the present embodiment, since the fluid heating device 96 is included, the inert gas supplied to the bubble column reactor 30 through the spare supply line 80 when the supply of the synthesis gas to the synthesis gas supply line 31 from the synthesis gas production unit 3 has been stopped can be heated before being supplied to the bubble column reactor 30 and the heated inert gas can be supplied to the bubble column reactor 30. Accordingly, it is possible to keep the internal temperature of the bubble column reactor 30 from dropping, and to secure the fluidization state of the catalyst slurry, and deterioration of the catalyst can be suppressed.

Additionally, since the drop of the internal temperature of the bubble column reactor 30 is suppressed, metal carbonyl compounds which deteriorate the catalyst can be kept from generating, even if the synthesis gas remains in the bubble column reactor 30. That is, when the internal temperature of the bubble column reactor 30 drops to a temperature lower than the decomposition temperature of the metal carbonyl compounds, there is a possibility that metal carbonyl compounds may generate as the synthesis gas which remains in the bubble column reactor 30 comes into contact with the iron, nickel, or the like composing the steel which forms the bubble column reactor 30.

Moreover, since the inert gas is supplied to the bubble column reactor 30 when the supply of the synthesis gas has been stopped, the catalyst can be kept from deteriorating due to a fluid supplied to the bubble column reactor 30.

As described above, when the supply of the synthesis gas to the bubble column reactor 30 has been stopped, it is possible to reliably suppress deterioration of the catalyst, and the yield of the hydrocarbon synthesis after operation is resumed can be improved.

Additionally, since the inert gas is supplied to the bubble column reactor 30 through the synthesis gas supply line 31, the inert gas supplied to the bubble column reactor 30 can pass through the catalyst slurry while flowing up therethrough similarly to the synthesis gas in the normal operation. Therefore, the suspended state of the catalyst slurry can be maintained by the inert gas equally to that in the FT synthesis reaction. Accordingly, the catalyst particles do not precipitate and accumulate, and the catalyst slurry is prevented from flowing back to a connection port between the bubble column reactor 30 and the synthesis gas supply line 31 to block the above connection port. Thereby, when the operation of the FT synthesis unit 5 is resumed, the yield of the hydrocarbon synthesis after the operation is resumed can be further improved without requiring time in order to suspend the catalyst particles in a medium oil to such a degree suitable for the FT synthesis reaction or to remove the slurry which has blocked the above connection port.

Additionally, the inert gas includes a gas consisting of any one of nitrogen gas, carbon dioxide gas, rare gas, methane gas, and ethane gas, or a mixed gas in which a plurality of these gases are mixed. Thereby, it is possible to reliably keep the catalyst from deteriorating due to the contacting the inert gas and the catalyst particles. Therefore, the yield of the hydrocarbon synthesis after the operation is resumed can be further improved.

Additionally, since the fluid heating device 96 is provided so as to heat the fluid which flows through the above flowing line 31A, the synthesis gas supplied to the synthesis gas supply line 31 from the synthesis gas production unit 3 in the normal operation can also be heated before being supplied to the bubble column reactor 30. Thereby, even in a case where metal carbonyl compounds which have an effect on the catalyst is contained in the synthesis gas, the synthesis gas can be heated by the fluid heating device 96 to decompose the metal carbonyl compounds and then can be supplied to the bubble column reactor 30. Accordingly, it is possible to keep the catalyst from deteriorating due to the metal carbonyl compounds contained in the synthesis gas, and the yield of the hydrocarbon synthesis by the FT synthesis reaction can be further improved.

Since the fluid heating device 96 heats the synthesis gas which flows through the synthesis gas supply line 31 to 140° C. or higher which is the decomposition temperature of $Fe_3(CO)_{12}$ (triiron dodecacarbonyl), the iron-carbonyl compound or nickel-carbonyl compound contained in the synthesis gas within the synthesis gas supply line 31 can be reliably decomposed. In addition, as for the decomposition temperatures of the other iron-carbonyl compounds with a lower number of carbonyl groups than $Fe_3(CO)_{12}$ among iron-carbonyl compounds, for example, the decomposition temperature of $Fe_2(CO)_9$ is about 100° C., and the decomposition temperature of $Fe(CO)_5$ is about 77° C. Moreover, as for the decomposition temperatures of the nickel-carbonyl compounds, for example, the decomposition temperature of $Ni(CO)_4$ is about 127° C. All the decomposition temperatures are lower than or equal to 140° C.

Moreover, the fluid heating device 96 heats the synthesis gas within the synthesis gas supply line 31 to the reaction temperature of the FT synthesis reaction in the bubble column reactor 30 or lower, while heating the synthesis gas to 140° C. or higher. Accordingly, when the heated synthesis gas is supplied into the bubble column reactor 30, the temperature of the inside of the bubble column reactor 30 is not excessively raised, and the FT synthesis reaction is stably performed. Thus, the yield of the hydrocarbon synthesis can be further improved.

Additionally, since the heat transfer pipe 32 is included, it is possible to keep the internal temperature of the bubble column reactor 30 from excessively rising by the reaction heat of the FT synthesis reaction.

Additionally, the heat transfer pipe 32 is configured so as to be switchable to the heating device which heats the inside of the bubble column reactor 30 when the supply of the synthesis gas to the synthesis gas supply line 31 from the synthesis gas production unit 3 has been stopped. By heating the inside of the bubble column reactor 30 by the heat transfer pipe 32 when the supply of the synthesis gas has been stopped, it is possible to reliably suppress a sudden drop in the internal temperature of the bubble column reactor 30 and to reliably suppress deterioration of the catalyst. Therefore, the yield of the hydrocarbon synthesis after the operation is resumed can be further improved.

Additionally, since the control device 82 is included, when supply of the synthesis gas to the synthesis gas supply line 31 from the synthesis gas production unit 3 has been stopped, it is possible to reliably supply the inert gas to the bubble column reactor 30 through the spare supply line 80. Therefore, a sudden drop in the internal pressure and temperature in the bubble column reactor 30 can be reliably suppressed. Accordingly, it is possible to reliably suppress deterioration of the catalyst, and the yield of the hydrocarbon synthesis after the operation is resumed can be further improved.

Additionally, the hydrocarbon synthesis reaction system 1 described above includes the hydrocarbon synthesis reaction apparatus in which the yield of the hydrocarbon synthesis is improved when operation is resumed after stoppage of the synthesis gas supply. Thus, the hydrocarbon synthesis reaction system 1 can improve the yield in the liquid fuel base stock production from a hydrocarbon feedstock.

Although the preferred embodiment of the invention has been described with reference to the accompanying drawings, the invention is not limited to such embodiments. It is apparent to those skilled in the art that various alternations or modifications can be made in the category as set forth in the claims, and it will be understood that these alternations or modifications naturally belongs to the technical scope of the invention.

For example, in the above embodiment, natural gas is used as a hydrocarbon feedstock to be supplied to the liquid fuel synthesizing system 1. However, the invention is not limited to such an example. For example, other hydrocarbon feedstocks, such as asphalt and residual oil, may be used.

In the above embodiment, a synthesis of hydrocarbons by the FT synthesis reaction is described as a synthesis reaction in the bubble column reactor 30. However, the technology related to the invention is not limited to this example, and the technology is applicable to the other synthesis reactions in the babble column reactor using a synthesis gas as a feedstock. As synthesis reactions for the target products other than hydrocarbons in the bubble column reactor using a synthesis gas as a feedstock, there can be examples such as oxo synthesis reaction (hydroformylation reaction, R—CH=CH$_2$+CO+ H$_2$→R—CH$_2$CH$_2$CHO), methanol synthesis reaction (CO+ 2H$_2$→CH$_3$OH), dimethylether (DME) synthesis reaction (3CO+3H$_2$→CH$_3$OCH$_3$+CO$_2$).

The detecting device 84 is not limited to the above embodiment as far as detecting the stoppage of supply of the synthesis gas from the synthesis gas production unit 3 to the synthesis gas supply line 31. For example, the detecting device 84 may be provided in the CO$_2$ removal unit 20, and may detect that the supply of the synthesis gas from the synthesis gas production unit 3 has been stopped when the operation of the CO$_2$ removal unit 20 has been stopped. Additionally, the detecting device 84 may not be provided.

In the above embodiment, although the fluid heating device 96 heats the fluid which flows through the above flowing line 31A, the fluid heating device is not limited thereto. For example, the fluid heating device 96 may heat the fluid which flows through the spare supply line 80. Additionally, the fluid heating device may heat both the fluid which flows through the above flowing line 31A and the fluid which flows through the spare supply line 80. Moreover, the temperature to which the fluid heating device 96 heats the synthesis gas which flows through the above flowing line 31A is not limited to the temperature shown in the above-mentioned embodiment.

In the above embodiment, the heat transfer pipe 32 is switchable to the heating device which heats the inside of the bubble column reactor 30 from the cooling device which cools the inside of the bubble column reactor 30 when the supply of the synthesis gas from the synthesis gas production unit 3 to the synthesis gas supply line 31 has been stopped. For example, the heat transfer pipe 32 may function only as a cooling device which cools the inside of the bubble column reactor 30. Additionally, the form of the cooling device which cools the inside of the bubble column reactor 30 is not limited to the heat transfer pipe 32 shown in the above embodiment.

Although the above embodiment includes the first on-off valve 86, the first on-off valve 86 may not be provided.

In the above embodiment, the spare gas tank 92 is connected to the spare supply line 80, and the second on-off valve 94 is provided in the spare supply line 80. However, the spare supply line 80 is not limited thereto if the spare supply line is connected to the synthesis gas supply line 31, and supplies the inert gas to the bubble column reactor 30 through the synthesis gas supply line 31 when the supply of the synthesis gas from the synthesis gas production unit 3 to the synthesis gas supply line 31 is stopped. For example, a supply device, such as a pump, may be provided in the spare supply line 80, and the inert gas in the spare gas tank 92 may be supplied to the bubble column reactor 30. Additionally, instead of the spare gas tank 92, an inert gas generation unit which generates inert gas may be connected to the above other end of the spare supply line 80.

In the above-mentioned embodiment, when supply of the synthesis gas from the synthesis gas production unit 3 to the synthesis gas supply line 31 has been stopped, the inert gas is supplied to the bubble column reactor 30. However, instead of this, the same effects as those can be obtained when hydrogen gas which is a component of the synthesis gas is supplied. In this case, the hydrogen gas may be stored in the spare gas tank 92. In this case, the hydrogen gas used may be the hydrogen gas which has been separated in the hydrogen separator 26 from the synthesis gas produced in the synthesis gas production unit 3, or unreacted hydrogen gas which has been discharged from and recovered in the hydrogenation reaction apparatuses in the upgrading unit 7, and the configuration may be made so as to allow such hydrogen gas to be supplied to the bubble column reactor 30 through the spare supply line 80.

Although the above embodiment includes the control device 82, the control device 82 may not be provided. For example, an operating unit which operates the first on-off valve 86, the second on-off valve 94, and the fluid heating device 96 may be provided, and when supply of the synthesis gas from the synthesis gas production unit 3 to the synthesis gas supply line 31 has been stopped, heated inert gas may be supplied to the bubble column reactor 30 as an operator of the liquid fuel synthesizing system 1 operates the first on-off valve 86, the second on-off valve 94, and the fluid heating device 96 by using the above operating unit.

INDUSTRIAL APPLICABILITY

According to the hydrocarbon synthesis reaction apparatus, hydrocarbon synthesis reaction system, and hydrocarbon synthesis reaction method of the invention, when the supply of the synthesis gas to the reactor has been stopped, a temperature drop in the reactor can be suppressed to secure the fluidization state of the catalyst slurry, deterioration of the catalyst can be suppressed to improve the yield of the hydrocarbon synthesis after operation is resumed.

REFERENCE SIGNS LIST

1: LIQUID FUEL SYNTHESIZING SYSTEM (HYDROCARBON SYNTHESIS REACTION SYSTEM)
3: SYNTHESIS GAS PRODUCTION UNIT (SYNTHESIS GAS SUPPLY DEVICE)
5: FT SYNTHESIS UNIT (HYDROCARBON SYNTHESIS REACTION APPARATUS)
7: UPGRADING UNIT
30: BUBBLE COLUMN REACTOR (REACTOR)
31: SYNTHESIS GAS SUPPLY LINE
31A: FLOWING LINE
32: HEAT TRANSFER PIPE (COOLING DEVICE, HEATING DEVICE)
80: SPARE SUPPLY LINE
82: CONTROL DEVICE
96: FLUID HEATING DEVICE

The invention claimed is:

1. A hydrocarbon synthesis reaction apparatus comprising:
a reactor for storing a catalyst slurry having solid catalyst particles suspended in a liquid, and in which the catalyst slurry make contact with synthesis gas including carbon monoxide gas and hydrogen gas as main components to synthesize hydrocarbons;
a synthesis gas supply line for supplying the synthesis gas to the reactor;
a fluid-heating device positioned at the synthesis gas supply line and configured to heat fluid flowed through the synthesis gas supply line;
a detecting device positioned at the synthesis gas supply line and which detects stoppage of supply of the synthesis gas to the reactor;
a first on-off valve positioned at the synthesis gas supply line;
a spare gas tank in which inert gas or hydrogen gas is stocked;
a spare supply line through which the inert gas or the hydrogen gas stocked in the spare gas tank is supplied to the reactor, wherein the spare supply line is connected to the synthesis gas supply line between the first on-off valve and the fluid-heating device;

a second on-off valve is positioned at the spare supply line; and a control device is configured to close the first on-off valve and to open the second on-off valve when the detecting device detects the stoppage of supply of the synthesis gas to the reactor; wherein when the supply of the synthesis gas to the reactor is stopped, the inert gas or the hydrogen gas stocked in the spare gas tank is supplied to the reactor through the spare supply line and the synthesis gas supply line while the inert gas or the hydrogen gas is heated by the fluid-heating device.

2. The hydrocarbon synthesis reaction apparatus according to claim 1, wherein the inert gas is a gas consisting of any one of nitrogen gas, carbon dioxide gas, rare gas, methane gas, and ethane gas, or a mixed gas in which a plurality of types of these gases are mixed.

3. The hydrocarbon synthesis reaction apparatus according to claim 1, further comprising a heat transfer pipe installed inside the reactor and through which heat is exchanged with the catalyst slurry, wherein while synthesizing the hydrocarbons inside the reactor, a liquid medium is flowed through the heat transfer pipe to recover reaction heat generated by synthesizing the hydrocarbons, and when the supplying of the synthesis gas to the reactor is stopped, the liquid medium is heated and then flowed through the heat transfer pipe to heat the catalyst slurry in the reactor.

4. A hydrocarbon synthesis reaction system for producing liquid fuel base stocks from a hydrocarbon feedstock, the system comprising:

a hydrocarbon synthesis reaction apparatus according to claim 1;

a synthesis gas production unit for reforming the hydrocarbon feedstock to generate the synthesis gas and which supplies the synthesis gas to a reactor of the hydrocarbon synthesis reaction apparatus; and an upgrading unit for refining the hydrocarbons generated in the reactor to produce the liquid fuel base stocks.

5. A hydrocarbon synthesis reaction method comprising:

heating a synthesis gas including carbon monoxide gas and hydrogen gas as main components by a fluid-heating device, supplying the synthesis gas heated by the fluid-heating device to a reactor storing a catalyst slurry having solid catalyst particles suspended in a liquid through a synthesis gas supply line to synthesize hydrocarbons by contacting the catalyst slurry with the synthesis gas in the reactor;

stocking inert gas or hydrogen gas in a spare gas tank; and supplying the inert gas or the hydrogen gas stocked in the spare gas tank to the reactor through the synthesis gas supply line along with heating the inert gas or the hydrogen gas by the fluid-heating device, in the wake of a stoppage of supplying the synthesis gas to the reactor.

* * * * *